United States Patent [19]

Chattha

[11] 4,276,392
[45] Jun. 30, 1981

[54] COATING COMPOSITION CATALYZED WITH PHOSPHONIC ACID DERIVATIVE - #3

[75] Inventor: Mohinder S. Chattha, Livonia, Mich.

[73] Assignee: Ford Motor Company, Dearborn, Mich.

[21] Appl. No.: 93,715

[22] Filed: Nov. 13, 1979

[51] Int. Cl.$^3$ ............................................. C08L 63/00
[52] U.S. Cl. ................................... 525/118; 427/386; 427/388.3; 525/438; 525/440; 525/508; 525/510; 525/511
[58] Field of Search ...................... 528/89, 99, 297; 525/438, 440, 508, 118, 510, 511; 427/421

[56] References Cited

U.S. PATENT DOCUMENTS

| | | | |
|---|---|---|---|
| 2,528,359 | 10/1950 | Greenlee | 525/511 |
| 2,528,360 | 10/1950 | Greenlee | 525/511 |
| 2,541,027 | 2/1951 | Bradley | 148/6.15 |
| 2,732,367 | 1/1956 | Shokal | 528/72 |
| 2,849,418 | 8/1958 | Fang | 525/208 |
| 3,133,838 | 5/1964 | Higgins | 148/6.15 |
| 3,198,850 | 8/1965 | Levantin | 525/110 |
| 3,201,374 | 8/1965 | Simms | 526/317 |
| 3,532,655 | 10/1970 | Radlove | 260/28.5 R |
| 3,651,169 | 3/1972 | Davis, Jr. | 525/511 |
| 3,773,710 | 11/1973 | Victorius | 260/31.2 R X |
| 3,790,513 | 2/1974 | Victorius | 260/39 R X |
| 3,846,368 | 11/1974 | Pettit, Jr. | 260/31.2 N X |
| 3,865,904 | 2/1975 | Wingler et al. | 260/42.21 X |
| 3,959,554 | 5/1976 | Hick | 428/336 |
| 3,960,979 | 6/1976 | Khanna | 525/110 |
| 4,002,699 | 1/1977 | Labana et al. | 260/18 R X |
| 4,018,848 | 4/1977 | Khanna | 260/14 X |
| 4,027,066 | 5/1977 | Victorius | 428/334 |
| 4,055,607 | 10/1977 | Sullivan et al. | 260/30.4 EP X |
| 4,169,825 | 10/1979 | Yapp et al. | 525/438 X |

Primary Examiner—Ronald H. Smith
Assistant Examiner—Thurman K. Page
Attorney, Agent, or Firm—Roger L. May; Olin B. Johnson

[57] ABSTRACT

A fast curing coating composition that is adapted for use as an automotive topcoat and which upon curing forms a hard, glossy, durable coating exhibiting excellent resistance to solvents and water. The coating composition which may contain greater than about 55 percent by weight of nonvolatile solids and, exclusive of pigments, solvents and other nonreactive components, consists essentially of:

(A) a polyepoxide resin having a number average molecular weight ($\overline{M}_n$) of between about 140 and about 3,000;

(B) a reactive catalyst comprising at least one phosphonic acid derivative;

(C) an amino resin crosslinking agent; and (D) optionally, a hydroxy functional additive.

The phosphonic acid derivative is included in the composition in an amount sufficient to produce between about 0.8 and about 1.4 equivalents of acid functionality for each equivalent of epoxy functionality in the polyepoxide resin and the amino resin crosslinking agent is included in the composition in an amount sufficient to provide at least about 0.4 equivalents of nitrogen crosslinking functionality for each equivalent of hydroxy functionality included in the composition.

12 Claims, No Drawings

COATING COMPOSITION CATALYZED WITH PHOSPHONIC ACID DERIVATIVE - #3

BACKGROUND OF THE INVENTION

This invention relates to a fast curing, thermosetting coating composition. More particularly, the invention relates to polymeric, high solids, fast curing coating compositions adapted to provide an automotive topcoat which demonstrates hardness, high gloss, outstanding durability and excellent resistance to solvents and water. Still more particularly, this invention relates to fast curing, high solids, thermosetting coating compositions adapted to be used as automotive topcoats wherein the topcoat includes metallic flake as a pigment.

Because of increasingly strict solvent emissions regulations in recent years, low solvent emission paints have become very desirable. A number of high solids paint compositions have been proposed to meet these low solvent emission requirements. However, many of these compositions are deficient because of difficulty in application, slow curing rates, lack of flexibility, poor durability, and low solvent and water resistance. Many of the proposed compositions have been particularly deficient as automotive topcoats, particularly when the topcoat is to include metallic flake as a pigment.

The deficiency in compositions including metallic flake results from undesired reorientation of the metallic flake during application and curing of the coating. The flake reorientation results primarily because of the very low viscosity resins used in the paint compositions to accommodate high solids. The low viscosity is not sufficient to immobilize the flakes which tend to redistribute themselves to show "reverse flop" and nonuniform distribution.

The coating compositions of this invention combine the above discussed desired properties and low application viscosity with rapid cure so as to overcome deficiencies of previously proposed high solids materials and thereby achieve a high solids coating composition particularly adapted for automotive topcoats including metallic flake as a pigment.

SUMMARY OF THE INVENTION

The thermosetting coating composition of this invention may contain greater than about 55 percent by weight of nonvolatile solids, preferably greater than about 70 percent by weight, and is capable of curing rapidly at a low temperature. The composition, exclusive of pigments, solvents and other nonreactive components, consists essentially of:
(A) a polyepoxide resin having a number average molecular weight ($\overline{M}_n$) of between about 140 and about 3,000;
(B) a reactive catalyst comprising at least one phosphonic acid derivative having the formula

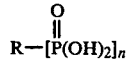

wherein n=1 to 2 and R is selected from the group consisting of alkyl, cycloalkyl or aryl radicals;
(C) an amino resin crosslinking agent; and
(D) up to about 45 weight percent based on the total weight of (A), (B), (C) and (D) of a hydroxy functional resin having a number average molecular weight ($\overline{M}_n$) of between about 150 and about 6000. The phosphonic acid derivative is included in the composition in an amount sufficient to provide between about 0.8 and about 1.4 equivalents, preferably between about 0.9 and about 1.1 equivalents of acid functionality for each equivalent of epoxy functionality on the polyepoxide resin. The amino resin crosslinking agent is included in the composition in an amount sufficient to provice at least about 0.4 equivalents, preferably between about 0.6 and about 2.1 equivalents of nitrogen crosslinking functionality for each equivalent of hydroxy functionality included in the composition either as (i) an organic hydroxyl group on the phosphonic acid derivative catalyst, (ii) a hydroxyl group on said hydroxy functional resin, or (iii) as a result of esterification of the epoxy functionality of said polyepoxide resin during cure of the composition. In addition, the high solids coating composition of the invention may include additives such as catalysts, antioxidants, U.V. absorbers, flow control or wetting agents, antistatic agents, pigments, plasticizers solvents, etc.

PRIOR ART

U.S. Pat. Nos. 3,960,979 and 4,018,848 to Khanna teach high solids coating compositions adapted for use as a can coating material. The compositions consist essentially of (i) aromatic epoxide compositions having two or more epoxy groups on an epoxy resin which has a molecular weight not exceeding 2500; (ii) an amino crosslinking agent; (iii) an inorganic or organic monomeric or polymeric acid which acts as a reactive catalyst; and (iv) a flexiblizing polyol.

The compositions of Khanna have the advantage of quick reaction and low application viscosity, but lack durability and, therefore, do not weather well. As such, the compositions of Khanna are not desirable for use as automotive topcoats. The Khanna patents describe the compositions as a low cure system. However, when considering the specific teachings of the patents one finds that the composition includes an excess of epoxide resin apparently with the purpose of "killing off" excess catalyst after completion of the curing reaction. Excess epoxy resin in the composition remains uncured at the low temperature bake range of the baking temperatures disclosed, not giving a complete cure and desirable hardness, durability or solvent resistance. If heated to higher temperatures, as called for in the examples, the excess epoxy does react with excess hydroxy functionality to give ether linkages. These ether linkages so obtained have a deleterious effect on durability and make the materials particularly unsuitable for use as an automotive topcoat. Also, the necessary high bake temperatures to achieve the utilization of this excess epoxy makes the composition undesirable from an energy point of view because of the high baking temperatures required. Still further, because the epoxy/catalyst reaction occurs in early stages of the cure, thus "killing off" the catalyst, the melamine hydroxy curing reaction must proceed substantially without benefit of catalysis. The curing reaction thus proceeds slowly and requires the higher temperatures of the Khanna examples.

DETAILED DESCRIPTION OF THE INVENTION

The coating compositions of this invention overcome disadvantages of prior art high solids compositions, including those of Khanna, to provide a system which is particularly suitable for those applications requiring high gloss, hardness, durability, and high solvent and water resistance as well as a fast cure rate at low temperatures, e.g., between about 75° C. and about 150° C., preferably between about 110° C. and about 130° C. The desirable characteristics of the coating compositions of this invention result from the carefully controlled admixture of the particular components, including a phosphonic acid derivative catalyst, to achieve substantially complete utilization of reactant functionality and a resultant highly crosslinked coating in a fast and efficient manner.

Each of the components of the high solids coating compositions, the amounts of each of the components required to achieve the desired results of the invention and a method for applying the composition are described hereinafter in greater detail.

POLYEPOXIDE RESIN

A principal material in the coating compositions of this invention is a polyepoxide resin having a number average molecular weight ($\overline{M}_n$) of between about 140 and about 3,000, preferably between about 300 and about 2,000.

The term polyepoxide resin as used herein means epoxide compounds or polymers containing 2 or more epoxide groups.

Polyepoxide resins useful in the invention are preferably selected from aliphatic, cycloaliphatic and aromatic polyepoxides falling within the stated molecular weight range. Such polyepoxides are well known compositions and any of these may be employed in the coatings of the invention. Among the many suitable types of polyepoxides are those disclosed by U.S. Pat. Nos. 3,404,018; 2,528,359; 2,528;360; 3,198,850; 3,960,979; and 4,018,848.

U.S. Pat. No. 3,404,018 discloses several particularly suitable types of polyepoxides including: (1) polyglycidyl ethers of polyhydric alcohols and polyhydric phenols; (2) epoxidized esters of polyethylenically unsaturated monocarboxylic acids; (3) glycidyl esters of polybasic acids; (4) epoxidized esters of unsaturated monohydric alcohols and polycarboxyl acids; and (5) epoxidized polymers and copolymers of diolefins. Many polyepoxides other than those recited in this or other referenced patents will be apparent to those skilled in the art.

PHOSPHONIC ACID DERIVATIVE CATALYST

A second essential component of the coating compositions of this invention is a reactive catalyst which comprises at least one phosphonic acid derivative having the formula:

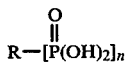

wherein n=1 to 2 and R is selected from the group consisting of alkyl, cycloalkyl, or aryl radicals. Preferably, the alkyl, cycloalkyl, or aryl radicals contain 1 to 10 carbon atoms. These radicals may be without pendent functionality or they may alternatively bear pendent hydroxyl groups, with mono- or dihydroxy radicals being preferred. Exemplary alkyl, cycloalkyl and aryl groups not bearing pendent functionality are butyl, cyclohexyl, benzyl and phenyl groups.

Most preferred of the groups not bearing additional functionality are primary, straight chain alkyl radicals containing 2 to 6 carbon atoms.

Among the numerous suitable mono- or dihydroxy functional radicals are: 2-hydroxyethyl, 2-ethyl-3-hydroxyethyl; 4-methylol-cyclohexylmethyl; 2,2 diethyl-3-hydroxypropyl; 8-hydroxyoctyl; 6-hydroxyhexyl; 2,2-dimethyl-3-hydroxypropyl; 2-ethyl-2-methyl-3-hydroxypropyl, 7-hydroxyheptyl; 5-hydroxypentyl; 4-methylolbenzyl; 3-hydroxyphenyl; 2,3-dihydroxypropyl; 5,6-dihydroxyhexyl; 2-(3-hydroxycyclohexyl)-2-hydroxyethyl; and 2-(3-hydroxypentyl)-2-hydroxyethyl.

The above radicals are intended to be only exemplary and numerous other radicals falling within the defined scope of the phosphonic acid derivative catalysts useful in the compositions of the invention will be apparent to those skilled in the art.

The phosphonic acid derivative catlysts useful in compositions of the invention may be prepared by addition of phosphonic acid to alkenes, hydrolysis of alkyl or substituted alkyl phosphorus (v) dihalides or correspondiing esters or by oxidative phosphonation of hydrocarbons. Such preparation techniques as well as others will be apparent to those skilled in the art.

The phosphonic acid derivatives employed in the compositions of the invention are reactive catalysts which allow the composition to cure rapidly at low temperature. The acid functionality of the phosphonic acid derivative or mixture of such derivatives reacts with the pendent epoxy functionality of the polyepoxide resin to form an ester and a hydroxyl group. Hydroxyl groups so generated as well as any organic hydroxyl groups which may be included as pendent hydroxyls on the alkyl, cycloalkyl or aryl radical of the phosphonic acid derivative and any optional hydroxyl groups included in the composition in the form of hydroxy functional additive crosslink with the amino resin crosslinking agent. It is critical to achieving the desired results of the high solids coating compositions of this invention, i.e., in making them suitable for use as automotive topcoats, that the amount of phosphonic acid derivative be sufficient to convert substantially all of the epoxy functionality on the polyepoxide resin to the desired hydroxy functionality by esterification reaction. Therefore, the phosphonic acid derivative is included in the composition in an amount sufficient to provide between about 0.8 and about 1.4 equivalents, preferably between about 0.9 and about 1.1 equivalents, of acid functionality for each equivalent of epoxy functionality on the polyepoxide resin. As will be noted from the equivalent amounts of epoxy and the phosphonic acid derivative stated above, the acid functionality need not be in stoichiometric amounts to the epoxy functionality. This is because of the fact that during curing of the high solids coating composition, residual water present in the composition hydrolyzes some of the esterified product back to acid and this hydrolyzed product then, in turn, reacts with additional epoxy functionality.

AMINO RESIN CROSSLINKING AGENT

A third essential component of the paint compositions of this invention is an amino resin crosslinking agent. Amino resin crosslinking agents suitable for crosslinking hydroxy functional bearing materials are well known in the art. Typically, these crosslinking materials are products of reactions of melamine, or urea with formaldehyde and various alcohols containing up to and including 4 carbon atoms. Preferably, the amino crosslinking agents useful in this invention are amine-aldehyde resins such as condensation products of formaldehyde with melamine, substituted melamine, urea, benzoguanamine or substituted benzoguanamine. Preferred members of this class are methylated melamine-formaldehyde resins such as hexamethoxymethylmelamine. These liquid crosslinking agents have substantially 100% nonvolatile content as measured by the foil method at 45° C. for 45 minutes. When preparing a high solids coating composition it should be recognized that it is important not to introduce extraneous diluents that would lower the final solids content of the coating.

Particularly preferred crosslinking agents are the amino resins sold by American Cyanamid under the trademark "Cymel". In particular, Cymel 301, Cymel 303 and Cymel 1156, which are alkylated melamine-formaldehyde resins, are useful in the composition of this invention.

The amino resin materials function as a crosslinking agent in the compositions of the invention by reacting with hydroxy functionality present in the composition (i) as an organic hydroxyl group on the phosphonic acid derivative in those cases where pendent hydroxyl functionality is present on the alkyl, cycloalkyl or aryl radical of the phosphonic acid derivative, (ii) as hydroxy functionality on the optional hydroxy functional additive, or (iii) as a result of esterification of the pendent epoxy functionality on the polyepoxide.

In order to achieve the outstanding properties which make these coating compositions particularly useful as automotive topcoat materials, it is essential that the amount of amino crosslinking agent be sufficient to substantially completely crosslink the hydroxy functionality in the coating composition. Therefore, the amino resin crosslinking agent should be included in the composition in an amount sufficient to provide at least about 0.4 equivalents, preferably between about 0.6 and about 2.1 equivalents, of nitrogen crosslinking functionality for each equivalents of hydroxy functionality included in the composition as discussed above.

OPTIONAL HYDROXY FUNCTIONAL ADDITIVE

Additional hydroxy functionality other than that achieved by esterification of epoxy functionality of the polyepoxide resin may be achieved by adding a hydroxy functional additive in amounts up to about 45 weight percent based on the total of the three above discussed components and the hydroxy functional additive itself. Such a material serves to provide additional hydroxy functionality so as to provide a more intimate crosslinked structure in the final cured product. The hydroxy functional additives useful in the composition are preferably selected from various polyols having a number average molecular weight ($M_n$) of between about 150 and about 6000, preferably between about 400 and about 2500. As used herein the term polyol means a compound having two or more hydroxyl groups.

The polyols useful for the invention preferably are selected from the group consisting of: (i) hydroxy functional polyesters; (ii) hydroxy functional polyethers; (iii) hydroxy functional oligoesters, (iv) monomeric polyols, (v) hydroxy functional copolymers produced by free radical polymerization of monoethylenically unsaturated monomers, one of which bears hydroxy functionality and which is included in the copolymer in an amount ranging from about 2.5 to about 30 weight percent of the copolymer and (vi) mixtures of (i)–(v).

The hydroxy functional polyesters useful in the invention are preferably fully saturated products prepared from aliphatic diabasic acids containing 2–20 carbon atoms, such as succinic acid, glutaric acid, adipic acid, azelaic acid, etc., and short chain glycols of up to and including 21 carbon atoms, such as ethylene glycol, 1,2-propylene glycol, 1,3-propylene glycol, 1,2-butylene glycol, 1,3-butylene glycol, 1,4-butylene glycol, neopentyl glycol, 1,4-cyclohexane dimethylol, 1,6-hexamethylene glycol and 2-ethyl-2-methyl-1,3 propane diol. The molecular weight of these materials ranges from about 200 to about 2500 and the hydroxyl number ranges from about 30 to about 230. The hydroxyl number is defined as the number of miligrams of potassium hydroxide needed for each gram of sample to neutralize the acetic acid generated during the reaction between the polyol and excess acetic anhydride. The polyester polyols utilized in the invention are low melting, soft waxy solids which are easily maintained in the molten state.

Among preferred polyesters are products derived from the esterification of ethylene glycol and 1,4 butane diol with adipic acid, ethylene glycol and 1,2 propylene glycol with adipic acid, azelaic acid and sebacic acid copolyester diols, and mixtures thereof.

Among useful polyether diols are polytetramethylene ether glycol, polyethylene glycol, polypropylene glycol and the like.

The hydroxy functional oligoesters useful as hydroxy functional additives in the compositions of the invention are oligoesters preferably having a molecular weight of between about 150 and about 3000. Such oligoesters may be selected from the group consisting of: (i) oligoesters prepared by reacting a dicarboxylic acid with a monoepoxide such as an alkylene oxide; (ii) oligoesters prepared by reacting a polyepoxide with a monocarboxylic acid; and (iii) oligoesters prepared by reacting a hydroxy functional monocarboxylic acid with either a mono- or polyepoxide.

The oligoester prepared by reacting a dicarboxylic acid with an alkylene oxide is a low molecular weight adduct which has a narrow molecular weight distribution when compared to similar compositions made by normal polyester manufacturing techniques. The adduct is prepared by reacting a dibasic carboxylic acid with alkylene oxides, preferably ethylene oxide or propylene oxide, in the presence of a catalyst. Preferred dicarboxylic acids are $C_6$–$C_{12}$ aliphatic acids such as adipic acid, azelaic acid, sebacic acid or dodecane dicarboxylic acid. Mixtures of these acids or mixtures of the aliphatic dicarboxylic acids and mixtures of these acids with aromatic dicarboxylic acids also yield suitable hydroxy functional oligoesters.

The preparation of oligoesters from monocarboxylic acids and polyepoxides is well known and is described, for example, in U.S. Pat. Nos. 2,456,408 and 2,653,141. Numerous hydroxy functional oligoesters within this general category will be apparent to those skilled in the art.

The third type of hydroxy functional oligoesters, i.e., those prepared by reaction of a hydroxy functional monocarboxylic acid with an epoxide is described in U.S. Pat. No. 3,404,018. While the epoxides employed in accordance with the teachings of that patent are polyepoxides, oligoesters may be prepared in a similar manner to that described therein by employing a monoepoxide, such as an alkylene oxide, and a hydroxy functional monocarboxylic acid as described therein. Numerous monoepoxide materials suitable for this purpose will be apparent to those skilled in the art.

Among the numerous monomeric polyols which may be employed as the hydroxy functional additive are the various short chain glycols of up to and including 21 carbon atoms which are useful in preparing the hydroxy functional polyesters discussed above. Other conventional polyhydric alcohols such as glycerols and sugar alcohols are also among the numerous monomeric polyols which will be apparent to those skilled in the art.

The hydroxyl bearing copolymer useful as the hydroxy functional additive may be formed from monoethylenically unsaturated monomers, with between about 2.5 and 30 weight percent bearing hydroxy functionality.

The long list of hydroxy functional monomers which may be employed in these hydroxy functional copolymers includes, but is not limited to, the following esters of acrylic or methacrylic acid and aliphatic alcohols: 2-hydroxyethyl acrylate; 3-chloro-2-hydroxypropyl acrylate; 2-hydroxy-1-methylethyl acrylate; 2-hydroxypropyl acrylate; 3-hydroxypropyl acrylate; 2,3-dihydroxypropyl acrylate; 2-hydroxybutyl acrylate; 4-hydroxybutyl acrylate; diethyleneglycol acrylate; 5-hydroxypentyl acrylate; 6-hydroxyhexyl acrylate; triethyleneglycol acrylate; 7-hydroxyheptyl acrylate 2-hydroxy-1-methylethyl methacrylate; 2-hydroxypropyl methacrylate; 3-hydroxypropyl methacrylate; 2,3 dihydroxypropyl methacrylate; 2-hydroxybutyl methacrylate; 4-hydroxybutyl methacrylate; 3,4 dihydroxybutyl methacrylate; 5-hydroxypentyl methacrylate; 6-hydroxyhexyl methacrylate; 1,3-dimethyl-3-hydroxybutyl methacrylate; 5,6 dihydroxyhexyl methacrylate; and 7-hydroxyheptyl methacrylate.

Although one of ordinary skill in the art will recognize that many different hydroxy bearing monomers including those listed above could be employed, the preferred hydroxy functional monomers for use in the hydroxy functional resin of the invention are $C_5$–$C_7$ hydroxy alkyl acrylates and/or $C_5$–$C_7$ hydroxy alkyl methacrylates, i.e., esters of $C_2$–$C_3$ dihydric alcohols and acrylic or methacrylic acids.

The remainder of the monomers forming the hydroxy functional copolymer, i.e., between about 90 and about 70 weight percent, are other monoethylenically unsaturated monomers. These monoethylenically unsaturated monomers, are preferably alpha, beta olefinically unsaturated monomers, i.e., monomers bearing olefinic unsaturation between the two carbon atoms in the alpha and beta positions with respect to the terminus of an aliphatic carbon to carbon chain.

Among the alpha-beta olefinically unsaturated monomers which may be employed are acrylates (meaning esters of either acrylic or methacrylic acids) as well as mixtures of acrylates and vinyl hydrocarbons. Preferably, in excess of 50 weight percent of the total of the copolymer monomers are esters of $C_1$–$C_{12}$ monohydric alcohols and acrylic or methacrylic acids, e.g., methyl methacrylate, ethylacrylate, butylacrylate, butylmethacrylate, hexylacrylate, 2-ethylhexylacrylate, laurylmethacrylate, etc. Among the monovinyl hydrocarbons suitable for use in forming the copolymers are those containing 8 to 12 carbon atoms and including styrene, alpha methylstyrene, vinyl toluene, t-butylstyrene and chlorostyrene. When such monovinyl hydrocarbons are employed, they should constitute less than 50 weight percent of the copolymer. Other monomers such as vinyl chloride, acrylonitrile, methacrylonitrile, and vinyl acetate may be included in the copolymer as modifying monomers. However, when employed, these modifying monomers should constitute only between about 0 and about 30 weight percent of the monomers in the copolymer.

OTHER MATERIALS

In addition to the above discussed components, other materials may be included in the coating compositions of the invention. These include materials such as catalysts, antioxidants, U.V. absorbers, solvents, surface modifiers and wetting agents as well as pigments. The solvents used in the coating compositions of the invention are those which are commonly used. Typical solvents useful in the coating compositions facilitate spray application at high solids content and include toluene, xylene, methylethyl ketone, acetone, 2-ethoxy-1-ethanol, 2-butoxy-1-ethanol, diacetone alcohol, tetrahydrofuran, ethylacetate, dimethylsuccinate, dimethylglutarate, dimethyladipate or mixtures thereof. The solvent in which the epoxy functional copolymer of the coating composition is prepared, may be employed as the solvent for the coating composition thus eliminating the need for drying the epoxy functional copolymer after preparation if such is desired. As mentioned above, the nonvolatile solids content of the high solids coating composition is at least 60 percent and preferably 70 percent or more, thus limiting the amount of solvent included in the composition.

Surface modifiers or wetting agents are common additives for liquid paint compositions. The exact mode of operation of these surface modifiers is not known, but it is thought that their presence contributes to better adhesion of the coating composition to the surface being coated and helps formation of thin coating on surfaces, particularly metal surfaces. These surface modifiers are exemplified by acrylic polymers containing 0.1–10 percent by weight of a copolymerized monoethylenically unsaturated carboxylic acid such as methacrylic acid, acrylic acid or itaconic acid, cellulose acetate butyrate, silicon oils or mixtures thereof. Of course, the choice of surface modifier or wetting agent is dependent upon the type of surface to be coated and selection of the same is clearly within the skill of the artisan.

The high solids coating composition of the invention also may include pigments. As noted above, the high solids composition of this invention are particularly useful when the coating composition includes metallic flake as a pigment. The rapid set and curing of the composition eliminates problems associated with redistribution of the metallic flake in the composition. The amount of pigment in the high soids coating composition may vary, but preferably is between 3 and about 45 weight percent based on the total weight of the paint composition. If the pigment is metallic flake, the amount ranges from about 1 to about 7 weight percent.

APPLICATION TECHNIQUES

The coating composition can be applied by conventional methods known to those in the art. These methods include roller coating, spray coating, dipping or brushing and, of course, the particular application technique chosen will depend on the particular substrate to be coated and the environment in which the coating operation is to take place.

A particularly preferred technique for applying the high solids coating compositions, particularly when applying the same to automobiles as topcoats, is spray coating through the nozzle of a spray gun.

The invention will be further understood by referring to the following detailed examples. It should be understood that the specific examples are presented by way of illustration and not by way of limitation. Unless otherwise specified, all references to "parts" is intended to mean parts by weight.

EXAMPLE 1

A hydroxy acrylic copolymer is prepared from the following monomers:

|                      | Wt/Grams | Wt. % |
|----------------------|----------|-------|
| Hydroxyethyl acrylate | 400     | 20    |
| Methylmethacrylate   | 400      | 20    |
| Styrene              | 200      | 10    |
| Butyl methacrylate   | 1000     | 50    |

One hundred (100) grams tert-butyl perbenzoate is added to the above monomer mixture and the resulting solution added dropwise over a period of two hours to 1600 grams of refluxing (145°) methyl amyl ketone (under nitrogen). The heating and stirring is continued for half an hour after the addition is complete and then five (5) grams of tert-butyl perbenzoate are added portionwise to the reaction mixture. The reaction mixture is refluxed for an additional ninety minutes and then allowed to cool to room temperature. The molecular weight is determined by Gel Permeation Chromatography: $\overline{M}_n = 2540$ $\overline{M}_w/\overline{M}_n = 1.94$ Calculated $T_g = 27°$ C.
Theoretical solids = 60%
Determined solids = 59.2%
Viscosity, #4 Ford Cup = 44 Sec.
Hydroxy equivalent weight = 980

Seventy parts of the above polymer are mixed with 15 parts of bis-(3,4-epoxy-6-methylcyclohexanemethyl) adipate (Araldite CY 178) and 19 parts of hexamethoxymethyl melamine (Cymel 301, American Cyanamid). This mixture is dissolved in 10 parts of butyl acetate and a solution of 4.95 parts of butyl phosphonic acid in five parts of butanol is added to it. The resulting mixture is stirred for one minute and then spray applied to primed panels in three coats with an intermediate flash of one minute and a final flash of five minutes. The panels are baked at 120° C. for 20 minutes to obtain clear coatings with excellent hardness, adhesion, gloss and solvent (methyl ethyl ketone and xylene) resistance.

EXAMPLE 2

Twenty parts of bis-phenol-A diglycidyl ether (Epon 828, Shell chemical Co.) and 14 parts of hexamethoxymethyl melamine (Cymel 301) are dissolved in 15 parts of n-butyl acetate and a solution of 8.5 parts of cyclohexyl phosphonic acid in 10 parts of isopropanol is added to it. The resulting formulation is applied to primed steel panels which are baked at 125° C. for 17 minutes to obtain coatings with excellent gloss, hardness, adhesion and solvent (xylene and methyl ethyl ketone) resistance.

EXAMPLE 3

Ten parts of the polymer solution described in Example 1 and 3 parts of Cymel 301 are added to the composition described in Example 2 and the resulting formulation is applied to primed steel panels. The panels are baked at 120° C. for 20 minutes to obtain hard, glossy coatings with excellent adhesion and solvent (xylene and methyl ethyl ketone) resistance.

EXAMPLE 4

An acrylic copolymer is prepared from the following monomers:

|                      | Parts by Weight |
|----------------------|-----------------|
| Butyl methyacrylate  | 26              |
| Ethylhexyl acrylate  | 20              |
| Hydroxyethyl acrylate| 30              |
| Styrene              | 24              |

The preparation is carried out in the same way as outlined in Example 1 by using cellusolve acetate as the solvent and tert-butyl peroctoate (5% of monomers) as initiator to obtain a 70% solution of the polymer. The calculated Tg is $-7°$ C. and the molecular weight from Gel Permeation Chromatography is $\overline{M}_n = 3070$ and $\overline{M}_w/\overline{M}_n = 2.2$.

Fifty (50) parts of the above polymer solution are mixed with 16 parts of aliphatic epoxy Araldite CY 178, 21 parts of Cymel 301 and ten parts of butyl acetate. A solution of six parts of phenyl phosphonic acid in seven parts of butanol is added to the above mixture and the resulting formulation applied by spraying to primed steel panels. The panels are baked at 125° C. for 15 minutes to obtain coatings with excellent physical properties.

EXAMPLE 5

Twenty (20) parts of the polymer solution from Example 4, 6 parts of Epon 828 and ten parts of cymel 301 are dissolved in nine parts of methyl amyl ketone. A solution of 1.8 parts of propyl-1,3-diphosphonic acid solution in five parts of ethanol is added to the above solution and the resulting formulation drawn on primed steel panels. The panels are baked at 125° C. for 20 minutes to obtain coatings with excellent hardness, adhesion and solvent resistance.

EXAMPLE 6

Seventy-five (75) parts of polymer solution from Example 4 are mixed with 16 parts of Araldite CY 178, 27 parts of Cymel 301, eight parts of aluminum flakes (65% in naphtha) and 14 parts of n-butyl acetate. A solution of six parts of phenyl phosphonic acid in seven parts of butanol is added to the above mixture and the resulting formulation was applied by spraying to primed steel panels in three coats. The panels are baked at 115° C. for 20 minutes to obtain silver metallic coatings with excellent hardness, adhesion and solvent (xylene and methyl ethyl ketone) resistance.

EXAMPLE 7

Three hundred fifty (350) parts of $TiO_2$ are mixed with 350 parts of Acryloid OL-42 (Rohm & Haas Chem. Co.) and 25 parts of n-butyl acetate. The above mixture is taken up in a porcelain bottle containing porcelain beads and put on a roller mill for 16 hours. Thirty-one (31) parts of this mill base are mixed with 10 parts of hydroxy ester Desmophen KL5-2330 (Rohm & Haas Chem. Co.), 5 parts of 1,4-butanediol diglycidyl ether and 16 parts of Cymel 301. A solution of 3.9 parts of phenyl phosphonic acid in five parts of butanol is added to the above mixture and the resulting formulation is applied by spraying to primed steel panels. The panels were baked at 120° C. for 18 minutes to obtain coatings with excellent gloss, hardness, adhesion and solvent (xylene and methyl ethyl ketone) resistance.

EXAMPLE 8

Five hundred (500) parts of TiO₂ and 250 parts of Ferrite yellow are mixed with 500 parts of Acryloid OL-42, 7.8 parts of dispersing agent BYK P 104S (Mellinckrodt) and 200 parts of n-butyl acetate; the mill base is prepared as described in Example 7. Forty-two (42) parts of this mill base are mixed with 15 parts of hydroxy ester Desmophen KL5-2330 (Rohm and Haas Chem. Co.), 16 parts of Cymel 301, seven parts of Araldite CY 178 and 10 parts of butyl acetate. A solution of 2.9 parts of benzyl phosphonic acid in 4 parts of butanol is added to the above mixture and the resulting formulation is applied by spraying to primed steel panels. The panels are baked at 125° C. for 17 minutes to obtain yellow coatings with excellent gloss, hardness, adhesion and solvent (xylene and methyl ethyl ketone) resistance.

EXAMPLE 9

Fifty (50) parts of Phthalo Blue pigment are mixed with 500 parts of Acryloid OL-42 and 44 parts of n-butyl acetate and the mill base is ground as described in Example 7. (a) Twenty-five (25) parts of the above mill base are mixed with 39 parts of Acryloid OL-42, 15 parts of 1,4-butanediol diglycidyl ether, 35 parts of Cymel 301, 5 parts of aluminum flakes (65% in naphtha) and 10 parts of n-butyl acetate. A solution of 11.7 parts of phenyl phosphonic acid in 15 parts of butanol is added to the above mixture and the resulting formulation is applied by spraying to primed steel panels in three coats. The panels are baked at 120° C. for 18 minutes to obtain blue metallic coatings with excellent hardness, adhesion and solvent (xylene and methyl ethyl ketone) resistance.

EXAMPLE 10

Twenty-one (21) parts of hexabutoxymethyl melamine (Cymel 1156) are employed as crosslinking agent in the formulation described in Example 1 instead of Cymel 301. The resulting formulation is applied by spraying to primed steel panels which are baked at 120° C. for 19 minutes to obtain clear coatings with excellent hardness, adhesion, gloss and solvent (xylene and methyl ethyl ketone) resistance.

EXAMPLE 11

Thirty-nine (39) parts of the mill base described in Example 9 are mixed with 27 parts of Acryloid OL-42, 26 parts of Epon 828 (Shell Chem. Co.), 41 parts of Cymel 301, 10 parts of aluminum flakes (65% in naphtha) and 23 parts of n-butyl acetate. A solution of 11.1 parts of cyclohexyl phosphonic acid in 15 parts of isopropanol is added to the above mixture and the resulting formulation is applied by spraying to primed panels in three coats. The panels are baked at 125° C. for 17 minutes to obtain a blue metallic coating with excellent hardness, adhesion and solvent (xylene and methyl ethyl ketone) resistance.

EXAMPLE 12

The formulation described in Example 2 is repeated by employing 17 parts of ethoxymethoxy benzoguanamine (Cymel 1123) as the crosslinking agent. The formulation is applied by spraying to primed steel test panels which are baked at 130° C. for 20 minutes to obtain hard, glossy coatings with excellent adhesion and solvent (xylene and methyl ethyl ketone) resistance.

EXAMPLE 13

Sixty-five (65) parts of the polymer solution from Example 1 are mixed with 15 parts of Epon 828, 29 parts of polypropyleneglycol (Pluracol P710, BASF Wyandotte Chem.) and 16 parts of butyl acetate. A solution of 5.4 parts of butyl phosphonic acid in 7 parts of butanol is added to the above mixture and the resulting formulation is applied by spraying to primed steel panels. The panels are baked at 130° C. for 20 minutes to obtain coatings with excellent gloss, hardness, adhesion and solvent (xylene and methyl ethyl ketone) resistance.

EXAMPLE 14

Twenty-five (25) parts of Acryloid OL-42 (Rohm and Haas Chem. Co.), 6 parts of Araldite CY 178, 3 parts of bis(hydroxypropyl) azelate and 17 parts of butoxymethyl urea resin (Beetle 80, American Cyanamid) are dissolved in 10 parts of butyl acetate. A solution of 2.3 parts of phenyl phosphonic acid in 5 parts of butanol is added to the above solution. The resulting formulation is applied to primed steel panels which are baked at 130° C. for 20 minutes to obtain coatings with excellent hardness, adhesion and solvent (xylene and methyl ethyl ketone) resistance.

EXAMPLE 15

Sixty (60) parts of the polymer solution described in Example 4 are mixed with 15 parts of aliphatic epoxy Araldite CY 178, 23 parts of Cymel 301 and ten parts of butyl acetate. A solution of 4.5 parts of 2-hydroxyethyl phosphonic acid in 7 parts of isopropanol is added to the above mixture and the resulting formulation is applied by spraying to primed steel panels. The panels are baked at 120° C. for 20 minutes to obtain coatings with excellent hardness, adhesion, gloss and solvent (xylene and methyl ethyl ketone) resistance.

EXAMPLE 16

Forty-five (45) parts of the mill base described in Example 8 are mixed with 24 parts of the hydroxy polymer solution from Example 1, 17 parts of Cymel 301, 9 parts of Araldite CY 178 and 12 parts of butyl acetate. A solution of 2.8 parts of 2-hydroxyethyl phosphonic acid in 5 parts of isopropanol is added to the above mixture and the resulting formulation is applied by spraying to primed steel panels. The panels are baked at 125° C. for 18 minutes to obtain yellow coating with excellent gloss, hardness, adhesion and solvent (xylene and methyl ethyl ketone) resistance.

In view of this disclosure, many modifications of this invention will be apparent to those skilled in the art. It is intended that all such modifications which fall within the true scope of this invention be included within the terms of the appended claims.

What is claimed is:
1. A thermosetting coating composition adapted for low temperature bake applications which, exclusive of pigments, solvents and other nonreactive components, consists essentially of:
 (A) a polyepoxide resin having a number average molecular weight ($\overline{M}_n$) of between about 140 and about 3,000;

(B) a reactive catalyst comprising at least one phosphonic acid derivative having the formula:

$$R[P(OH)_2]_n$$
$$\overset{O}{\underset{}{\|}}$$

wherein n=1 to 2 and R is selected from the group consisting of alkyl, cycloalkyl and aryl radicals;
(C) an amino resin crosslinking agent; and
(D) up to about 45 weight percent based on the total weight of (A), (B), (C) and (D) of a hydroxy functional additive having a number average molecular weight ($\overline{M}_n$) of between about 150 and about 6000, said phosphonic acid derivative being included in said composition in an amount sufficient to provide between about 0.8 and about 1.4 equivalents of acid functionality for each equivalent of epoxy functionality on said polyepoxide resin, and said amino resin crosslinking agent being included in said composition in an amount sufficient to provide at least about 0.4 equivalents of nitrogen crosslinking functionality for each equivalent of hydroxy functionality included in said composition as a group on an initial component thereof or generated in situ as a result of esterification of said pendent epoxy functionality of said copolymer during cure of said coating composition.

2. A composition in accordance with claim 1, wherein said polyepoxide resin is selected from the group consisting of aliphatic, cycloaliphatic and aromatic polyepoxides havin a number average molecular weight of between about 300 and about 2,000.

3. A composition in accordance with claim 1, wherein said reactive catalyst comprises at least one phosphonic acid derivatives wherein R is an alkyl, cycloalkyl or aryl radical containing 1 to 10 carbon atoms.

4. A composition in accordance with claim 1, wherein said reactive catalyst comprises at least one phosphonic acid derivative wherein R is an alkyl, cycloalkyl or aryl radical bearing pendent hydroxy functionality.

5. A composition in accordance with claim 4, wherein R is a mono- or dihydroxy alkyl, cycloalkyl or aryl radical.

6. A composition in accordance with claim 1, wherein said reactive catalyst comprises at least one phosphonic acid derivative wherein R is an alkyl, cycloalkyl or aryl group which does not bear pendent functionality.

7. A composition in accordance with claim 6 wherein said R is a primary, straight chain alkyl radical containing 2 to 6 carbon atoms.

8. A composition in accordance with claim 1 wherein said amino resin crosslinking agent is an amine-aldehyde resin selected from the group consisting of condensation products of formaldehyde with melamine, substituted melamine, urea, benzoguanamine, and substiituted benzoguanamine, and mixtures of said condensation products, and is included in an amount sufficient to provide between about 0.6 and about 2.1 equivalents of nitrogen crosslinking of functionality per equivalent of hydroxy functionality.

9. A composition in accordance with claim 1 wherein said hydroxy functional additive is selected from the group consisting of (i) hydroxy functional polyesters, (ii) hydroxy functional polyethers, (iii) hydroxy functional oligoesters, (iv) monomeric polyols, (v) hydroxy functional copolymers formed from monoethylenically unsaturated monomers, one or more of which bears hydroxy functionality and which is included in said copolymer in amounts ranging from about 10 to about 30 weight percent of said copolymer, and (vi) mixtures of (i)-(v).

10. A composition in accordance with claim 1 wherein said phosphonic acid derivative catalyst is included in said composition in an amount sufficient to provide between about 0.9 and about 1.1 equivalents of acid functionality for each equivalent of epoxy functionality on said polyepoxide resin.

11. A composition in accordance with claim 1, wherein said composition contains greater than about 55% by weight of nonvolatile solids.

12. A composition in accordance with claim 1, wherein said amino resin crosslinking agent is included in said composition in an amount sufficient to provide between about 0.6 and about 2.1 equivalents of nitrogen crosslinking functionality for each equivalent of hydroxy functionality included in the composition either (i) as an organic hydroxyl group on said phosphonic acid derivative, (ii) as hydroxy functionality on said hydroxy functional additive, or (iii) as a result of esterification of the pendent epoxy functionality on said polyepoxide resin.

* * * * *